United States Patent [19]

Mueller

[11] 4,023,955
[45] May 17, 1977

[54] CONTROLLED RELEASE FERTILIZER

[75] Inventor: Otto H. Mueller, Fort Wayne, Ind.

[73] Assignee: General Portland, Inc., Dallas, Tex.

[22] Filed: Oct. 4, 1974

[21] Appl. No.: 512,090

Related U.S. Application Data

[63] Continuation-in-part of Ser. No. 337,456, March 2, 1973, abandoned.

[52] U.S. Cl. .................. 71/64 F; 71/28; 427/214
[51] Int. Cl.² .......................................... C05C 9/00
[58] Field of Search ............ 71/1, 64 E, 64 F, 28; 427/212, 214, 221

[56] References Cited
UNITED STATES PATENTS

| | | |
|---|---|---|
| 2,806,773 | 9/1957 | Pole .................................. 71/64 E |
| 3,192,031 | 6/1965 | Zaayenga ............................. 71/28 |
| 3,400,011 | 9/1968 | Fox ................................... 71/64 F |
| 3,630,713 | 12/1971 | Adams ................................ 71/64 E |
| 3,660,070 | 5/1972 | Maruta et al. ....................... 71/64 E |

Primary Examiner—Frank A. Spear, Jr.
Assistant Examiner—Ferris H. Lander
Attorney, Agent, or Firm—Richards, Harris & Medlock

[57] ABSTRACT

A solid controlled release fertilizer of a discrete particle of a fertilizer material encapsulated within a coating of partially hydrated cement is provided. In a preferred embodiment, the partially hydrated cement coated fertilizer particle is encapsulated within a thin semipermeable elastomer coating. In another embodiment, the thin semipermeable elastomer is in turn encapsulated within a second partially hydrated cement coating which contains micronutrient trace elements.

15 Claims, 2 Drawing Figures

CONTROLLED RELEASE FERTILIZER

CROSS REFERENCES TO RELATED APPLICATIONS

This application is a continuation-in-part of application Ser. No. 337,456, filed Mar. 2, 1973, now abandoned.

BACKGROUND OF THE INVENTION

This application relates to a controlled release fertilizer, i.e., a material which releases its fertilizer component for utilization to the soil over a sustained and rather prolonged period of time.

Fertilizers of course, have been used for many years to improve the quality of soil, and particularly for application to the soil for the purpose of providing various nutrient, growth sitmulant and other positive factors to seeds and plants to enhance their growth and production.

It is well known that solid fertilizers tend to be rapidly absorbed and degraded in the soil. This rapid absorption and degradation limits the longevity of the fertilizer's usefulness causing low efficiency of plant utilization when compared to the nutrients initially available, and increasing production costs by requiring frequent reapplication. Various chemical and/or mechanical inhibitors or retardants have therefore been employed to decrease these rapid absorption and degradation rates. The objectives sought to be achieved by utilizing such inhibitors or retarders is to release assimilable amounts of certain nutrients, stimulators and the like over a relatively long period of time.

Various approaches have been made in the past to provide a solid fertilizer material which utilizes these mechanical or chemical inhibiting or retarding means, such as a coating, to cause the fertilizer to be released to the soil and surrounding plant life over a relatively long period of time. Some of these methods have been relatively successful. For example, fertilizers in small pellet or bead form have been coated with various polymer-like materials. Some polymer coatings have been effective to control the release of the encapsulated fertilizer in such a way that it becomes available to the soil and plant life therein over a period of many days or weeks, as contrasted to an almost immediate total release. However, when such polymers are used as the sole coating material, large amounts are required to attain the desirable release characteristics. A marked disadvantage of a control release fertilizer utilizing such polymer coatings is the high cost of the polymer used. This naturally makes the ultimate product expensive. Moreover, when the polymers are utilized as the exclusive coating agent, difficulty in obtaining a desired release rate has been experienced.

Additionally, micronutrient trace elements such as, for example, boron and manganese, are known to be required for proper growth of all plants. These micronutrient trace elements, however, need only be present in minute amounts to be effective. Moreover, such micronutrient trace elements should preferably be released to the soil and plants herein at a more rapid rate than other fertilizer material such as the macronutrients consisting of nitrogen, phosphorous and the like.

When single coating techniques, such as coating with various polymer-like materials is used, all nutrients, including any micronutrient trace elements contained within the encapsulated material are caused to be controllably released. Thus, a control release fertilizer containing only a single coating cannot selectively release different fertilizing constituents at differing intervals.

SUMMARY OF THE INVENTION

The present invention comprehends the finding that partially non-hydrated cement can be utilized as an encapsulating or coating material for the fertilizer. Cement is far less expensive than polymer, and its use makes it possible to overcome the severe expensive disadvantage in utilizing polymer. In addition, cement coated fertilizer provides advantageous rate of fertilizer release for many applications.

In addition, this invention comprehends the finding that partially non-hydrated cement which is utilized as a coating material for the fertilizer can itself be encapsulated in a thin semipermeable elastomer. The use of the cement and elastomer together is not as expensive as the polymer when used alone and provides a control release fertilizer which is superior to using either the cement or the polymer alone. Morover, the use of thin semipermeable elastomer coating prevents agglomeration experienced when the cement coating, having hydroscopic properties is the sole coating material utilized.

This invention also comprehends the discovery that admixing the so-called micronutrient trace elements with the cement prior to coating provides a selective release of such micronutrient trace elements which is more rapid than the release of the encapsulated fertilizer.

In accordance with the present invention, discrete particles of fertilizer are coated with an effective amount of cement. The cement may either be of the typical Portland or masonry type, with each possessing advantages in certain instances. In either case, the cement is only partially hydrated to produce a partially unhydrates substantially uniform coat of cement about a discrete fertilizer particle. For thick coatings, where quite slow release rates are desired, masonary cement is preferred.

In accordance with the preferred embodiment of the instant invention, a novel controlled release solid fertilizer is provided which includes a discrete particle of a fertilizer material encapsulated in a substantially uniform coat of an effective amount of a partially unhydrated cement. The cement encapsulated fertilizer particle is in turn encapsulated in a semipermeable elastomer. In accordance with this embodiment, the fertilizer particle is preferably a granule, pellet or prill of a nonorganic substance, such as urea. The elastomers are preferably the so called emulsion elastomers consisting of a group commonly known as latexes. The preferred latexes are the emulsified latexes, which are degradable.

According to another embodiment of the instant invention, the discrete particles of fertilizer are coated with an effective amount of a partially unhydrated cement which is in turn encapsulated in a semipermeable elastomer. The elastomer coated, cement coated particle is then further encapsulated in a second coat of a mixture of cement and micronutrient trace elements, which is also partially hydrated.

According to another aspect of the instant invention, a method for manufacturing a control release fertilizer is provided wherein a discrete particle of fertilizer material is coated over substantially the entire surface area with the substantially uniformly thick layer of a cement in a saturated aqueous atmosphere to partially hydrate the cement. The cement coated fertilizer particle thus produced can then be coated with a substantially uniformly thick layer of an aqueous semipermeable elastomer emulsion. Finally, the elastomer covered fertilizer particle can be coated with a substantially uniformly thick layer of a mixture of cement and micronutrient trace elements in a saturated aqueous atmosphere to partially hydrate the cement.

DETAILED DESCRIPTION OF PREFERRED EMBODIMENTS

Figure 1:
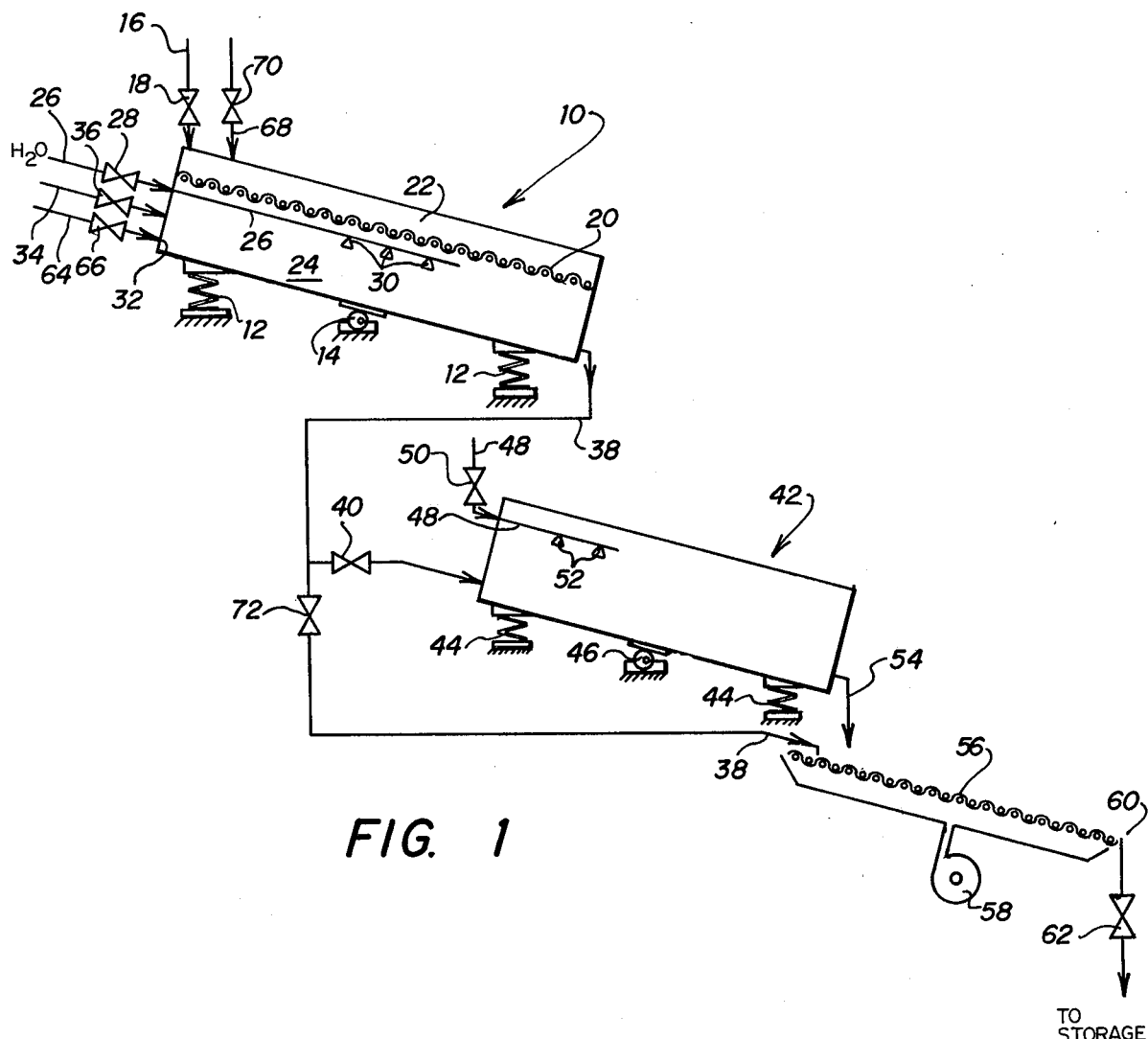
FIG. 1 is a schematic flow diagram of a device used to practice the instant invention.

Referring now to the drawings, and particularly FIG. 1, an enclosed six foot elongated vessel 10 which is inclined at about a 15° angle from horizontal is movably supported by coil springs 12. Vessel 10 is caused to vertically oscillate with an amplitude of about ⅝ inch by an eccentric cam 14 contacting the bottom of vessel 10 and being rotationally driven by a motor means (not shown).

In operation, vessel 10 is caused to oscillate by energizing the motor means to drive the cam 14. Cement powder, which is preferably masonry cement, passes from a source (not shown) through a conduit 16 and valve 18 into vessel 10 coming to rest upon semipermeable member 20. Semipermeable member 20 which can be, for example, a screen having 100 openings per inch (No. 10 Tyler screen) is supported with vessel 10 to form an upper chamber 22 adjacent the upper closed end of vessel 10 and a lower coating chamber 24. Semipermeable member 20 is preferably heated by a heating means which may be any type known in the art, e.g., electric, gas and the like, such that the powdered cement resting thereon is prevented from accumulating moisture and thus agglomerating.

Simultaneously, water is passed into coating chamber 24 through conduit 26, valve 28, and three spaced apart atomizing nozzles 30 which are in communication with conduit 26 and disposed interiorly to vessel 10. Atomizing nozzles 30 are preferably spaced about 18 inches from each other and the nozzle in closest proximity to the upper end wall 32 is about 2.5 feet therefrom. Atomizing nozzles 30 may be any type known in the art which produce a fine mist or fog of water.

Next, a particulate solid fertilizer which may be a granule, pellet or prill, enters vessel 10 through conduit 34 and valve 36. The oscillatory motion of vessel 10 causes the solid fertilizer perticles to vibrate with an amplitude of about ⅝ inch and traverse within vessel 10 toward the lower end wall of vessel 10 at a rate of from about 1 inch to about 2 inches per second. The oscillatory motion of vessel 10 also causes powdered cement resting on semipermeable member 20 to selectively pass therethrough into coating chamber 24. As the solid fertilizer particles travel toward the lower end of wall vessel 10, they become more spherical and are brought into intimate contact with cement powder and moisture. The oscillating fertilizer particles are thus coated with a progressively thicker coating as they traverse the lower coating chamber 24 of vessel 10.

The cement coated fertilizer particles pass through conduit 38 and valve 40 into a second enclosed six foot elongated vessel 42. Vessel 42, like vessel 10, is resiliently mounted on springs 44 and is vertically oscillated with an amplitude of about ⅝ inch by an eccentric cam 46 in contact with the bottom of vessel 42 which are rotationally driven by a motor means (not shown). The motor means being energized, vessel 42 oscillates, thus imparting a vertical amplitude of about ⅝ inch to the cement coated particle entering vessel 42.

As the cement coated fertilizer particles enter vessel 42, a latex-water emulsion from a source (not shown) is passed through conduit 48, valve 50, through two sonic nozzles 52. Sonic nozzles 52, which may be any type known in the art, e.g., compressed air, steam, electric and the like, are disposed within vessel 42 and spaced about two feet from each other. The nozzle 52 in closest proximity to upper end wall of the vessel is approximately two feet therefrom. As the cement coated fertilizer particles vibrate and traverse vessel 42 in the direction of the lower end wall at the rate of from about 1 inch to about 2 inches per second, they are brought into intimate contact with a supersaturated latex-water emulsion atmosphere and are thus coated with successively increasing amounts of the latex-water emulsion.

The latex emulsion coated particles upon reaching the lower end of vessel 42 are passed through conduit 54 onto an inclined air permeable member which is preferably a No. 16 Tyler screen. A blower 58 which may be any type known in the art, e.g., a fan, a squirrel cage or the like, forces air which is heated to about 120° to about 160° F by a suitable heater means, for example, gas, electric or the like, from the bottom of permeable member 56 through the coated particles resting thereon, thus removing moisture from the latex-water emulsion coating. The dry particle is then passed through conduit 60 and valve 62 to a suitable storage means (not shown).

When the particles are to be further coated with an outer layer of cement and fertilizer in accordance with another embodiment of the invention, the dried particles on permeable member 56 are recycled by suitable conduit means (not shown) to enter vessel 10 through conduit 64 and valve 66. Vessel 10 is oscillated as previously described and a premixed homogenous cement-fertilizer powder enters vessel 10 through conduit 68 and valve 70 from a cement-fertilizer source (not shown). The cement-fertilizer powder coming to rest on semipermeable member 20 which is heated as described above is dried to prevent agglomeration. As previously described, water passes through conduit 26, valve 28, through atomizing nozzles 30 into coating chamber 24. The oscillated particles have an amplitude of about ⅝ inch and traverse toward the lower end of vessel 10 at a rate of from about 1 inch to about 2 inches per second. As the fertilizer particles pass along the bottom of vessel 10, they are brought into intimate contact with the cement-fertilizer powder and moisture thereby coating the oscillating particles with a progressively thicker coating as they proceed along the bottom of vessel 10 toward the lower end wall of the vessel. As the coated particles reach the lower end wall, they pass through conduit 38 through valve 72 and are deposited upon air permeable member 56. The particles are then dried on air permeable member 56 as previously described, and transferred to storage through conduit 60 and valve 62.

Figure 2:
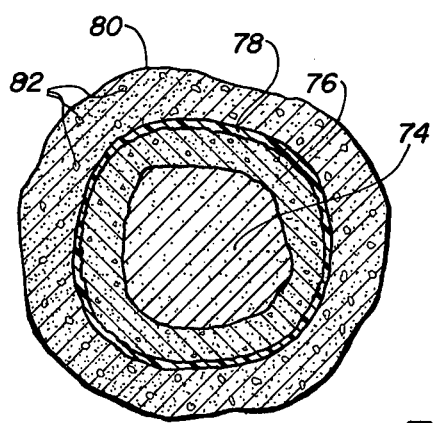
FIG. 2 is a sectional view of a controlled release fertilizer produced in accordance with the invention.

The control release fertilizer produced in accordance with the above-described process is shown in FIG. 2. Specifically, a discrete particle of a fertilizer material 74 is encapsulated in a substantially uniform coating 76 of a cement which is partially unhydrated. The fertilizer particle so coated comprises one embodiment of the instant invention.

Within the scope of the invention, the particle 74 coated with coating 76 of a partially unhydrated cement is again encapsulated in a thin coating 78 of an elastomer. Finally, in accordance with another embodiment, the elastomer coated cement coated fertilizer particle can be again coated with a substantially uniform coating 80 of a partially unhydrated cement containing interspersed therein minute fertilizer particles 82 which are preferably micronutrients.

Thus, as can be seen, a discrete particle of a fertilizer material can be successively coated with a partially unhydrated cement which in turn can be coated with a thin layer of an elastomer which also in turn can be coated with a second partially unhydrated cement coating containing minute particles of fertilizer. Therefore, in accordance with the invention, the particle of fertilizer material can receive one or more successive coatings, depending upon the particular application for which it is to be used.

The solid fertilizer particles that can be utilized within the scope of the instant invention can be any material commonly used to supply nutrient and positive factors to the soil and the plants contained therein. The fertilizer materials may be of either the so-called organic type or the so-called nonorganic chemical type. Additionally, such fertilizer material may contain varying amounts of the so-called macronutrients for example, nitrogen, phosphorous and the like or may contain the so-called micronutrient trace elements for example, calcium, magnesium, sulphur, cobalt, copper, iron, manganese, molybdenum, sodium and zinc. Of all the solid fertilizers available, none is presently known which cannot be satisfactorily utilized in accordance with the present invention to provide a suitable product. It should be noted, however, that the micronutrient trace elements are preferably utilized in accordance with the present invention within an outer coating for selective release as further described herein.

The cement that can be used within the scope of the instant invention may be of the typical Portland or masonary type or the cements of the gypsum type. Masonry cement is preferred because of ease of application. When two coatings of cement are utilized, i.e., an inner first coat to encapsulate the fertilizer particle and an outer second coat to encapsulate the latex coated particle, the second cement coating may be of either the typical Portland or masonry type or may contain gypsum and limestone, as well as plasticizers.

The average physical characteristics of Portland cement involve a particle configuration such that the cement has about 1800 square centimeters surface area per gram (measured by the Waggoner method—about 3200 square centimeters when measured by the Blaine method). Masonry cement, on the other hand, typically has a surface area configuration involving approximately 6400 square centimeters per gram, as measured by the Blaine method.

The cement coating in accordance with the present invention substantially uniformly encapsulates the fertilizer particle. While the cement within the coating is actually hydrated to some extent, the absolute amount of hydration is not as critical as the way in which the cement is hydrated. Specifically the moisture existing as a fog, fine mist, or the like, selectively contacts individual cement particles. Not all cement particles are, however, contacted with water. The water is almost immediately absorbed into the nonhydrated particles, thus giving them agglomerating characteristics. That is, the particular particles receiving the moisture in the presence of other nonhydrated particles "stick" to the nonhydrated particles as well as the fertilizer particle. As the agglomeration of the nonhydrated and hydrated cement particles proceeds, the fertilizer accumulates a progressively thicker uniform coating.

Further, because the cement coating is agglomerated in this manner in the absence of free water, the cement within the coating becomes, what can best be described, as "Point hydrated". That is, only a small percentage of cement particles within the coating form an actual hydration product to any degree. Thus, point hydration creates a lattice structure within the cement to securely hold the nonhydrated particles. The nonhydrated cement within the lattice of the point hydrated cement makes it possible to get a rather rapid initial rate of fertilizer release to the environment while still providing a long term control release for a substantial portion of the fertilizer. Such a high release rate for an initial quantity of fertilizer followed by a controlled slow release of the remainder, e.g., over about 60 days, is found quite advantageous for many agricultural uses.

The cement coating of the present invention can be applied in different thicknesses, thereby varying the rate of release of the fertilizer to meet the desired release rate characteristics for a particular fertilizing or growing situation. The thickness of coating may be selected to provide the particular release rate desired, however, it is preferred that when cement alone is used to uniformly encapsulate the fertilizer particle, there be a certain maximum thickness. If the maximum thickness is exceeded, flaking problems and uneven coating tend to result. In general, the preparation of coatings exceeding this thickness require excess amounts of moisture. This excess moisture causes free water to be present, forming other than a point hydrated product. The porosity of the coating is therefore deleteriously affected. Moreover, the product containing free water further hydrates on passage of a short period of time. The excessive hydration causes flaking, which ruptures or breaks the integrity of the coating structure. Such a rupture vastly alters the normal permeability. Therefore, such flaking destroys the integrity of the product and its ability to control the release of the fertilizer.

To avoid flaking problems, a maximum thickness expressed as about 11% by weight of Portland cement for a 1/16 inch in diameter fertilizer particle is preferred. If masonry cement is used instead of Portland, up to about 22% by weight masonry may be used, in both instances the expression of percentage being on the basis of the weight of fertilizer coated, and the particle size of the fertilizer coated being approximately 1/16 of an inch in diameter. It is to be understood that the thickness of the cement coating, rather than the weight percent involved, is believed to be the true critical factor, and weight percent is utilized merely as a convenient expression of thickness for a fertilizer particle size of 1/16 inch in diameter. When a different size fertilizer is used, the percent cement would be varied to provide substantially the same thickness coating as is present on the 1/16 inch in diameter fertilizer particle.

The minimum quantity of cement in accordance with the present invention is a sufficient quantity to fully coat the fertilizer particle. When the cement is utilized as the only coating, complete coating of 1/16 inch in diameter fertilizer particle requires on the order of about as much as 7% Portland cement and 10% masonry cement expressed as a percentage by weight based upon the weight of the fertilizer component only. Generally, in this situation, the miniumum coating thickness is about 1/50 of an inch for a Portalnd cement coating and about 1/25 of an inch for a masonry cement coating of the particulate fertilizer material. When thicker coatings are required to obtain the desired release rate, it is found that better results are achieved in many instances by adding some limestone (calcium carbonate). For example, from about 45% to about 55% limestone to the Portland cement may be added. The limestone is, of course, intimately admixed with the Portland prior to application of the cement to the fertilizer particles.

When the cement coating is to be used in conjunction with an elastomer coating, the thickness of the cement coating can be varied depending upon the desired release rate required for a particular application. However, it should be noted that when an elastomer is used in conjunction with the cement, a thinner cement coating will effectively provide the same release rate.

When used with the elastomer, preferably the cement coating will constitute about 4% by weight to about 6% by weight per weight of the fertilizer component only and more preferably, about 4% by weight per weight of the fertilizer component only. These weights are based upon an average fertilizer particulate size of about 1/16 inch in diameter. When a different size fertilizer particle is used, the percent cement would be varied to provide substantially the same thickness coating as is present on the 1/16 inch in diameter fertilizer particle.

It is pointed out that a masonry cement coating is preferable in many instances since thicker satisfactory coatings are possible with the masonry cement and since such thicker coatings provide a slower release rate. In general, the thicker the coating, the more slowly the fertilizer is released to the environment. It is easier to get a uniform coating on the fertilizer particles with masonry cement. Therefore, it is possible to control the release rate more accurately by coating the particles with masonry cement. In addition, masonry cement coatings on the fertilizer particles are less brittle and withstand handling stress better than coatings with conventional Portland cement.

However, a coating of Portland cement has the advantage of a slower release rate for a given coating thickness. Therefore, the use of the Portland cement coatings is economically attractive because less material must be utilized to obtain the same release rate, and there are secondary savings in freight costs and the like due to reduced coating weights.

The determination of the amount of water to admix during the mixing process is somewhat empirical. Generally, there should be sufficient water to form an initial point contact of the cement and water, thus causing the cement to stick to the fertilizer particle and to other particles of cement. Yet the amount of moisture can not be of an amount to cause washing or even coating of the cement particles.

The amount of moisture required to effect the substantially uniform, partially nonhydrated coating in accordance with the instant invention is from about 2% to about 6% by weight, based on the weight of the cement alone. When masonry cement is used, the amount of water added is preferably from about 2% to about 4½% by weight of the cement alone, and more preferably, 2% by weight of the cement alone.

When Portland cement is utilized, the amount of water added is preferably from about 3% to about 6% by weight of the cement alone and preferably, about 3% by weight based on the cement alone.

The actual amount of water will depend on the thickness of the coat required. A rather rough and ready test may be run visually with a particular cement-fertilizer combination to check the amount of moisture needed by introducing an atomized spray of water into a transparent jar in which the materials to mix are being shaken. When the cement material begins to stick to the jar, this is an indication that the rate of moisture introduction is too high. In actual practice, proper adjustment may be made by frequent inspection of the materials. When excessive agglomeration is noted, the amount of moisture should be cut back.

When the cement coating is to be utilized in conjunction with an elastomer, the hydration of the cement must be controlled within finer tolerances than when used without the elastomer. Specifically, the amount of moisture used should be just sufficient to coat the surface of some of the dehydrated cement with a fine water film but should not be of a quantity such that the water "flows" on the surface of the cement coated particle. Preferably, just enough moisture is applied so that the surface tension of the water prevents flow. Therefore, the partial hydration of the cement in accordance with this embodiment is preferably accomplished in a humid atmosphere, for example, about 95% humidity, containing a mist of finely dispersed water droplets. Such an atmosphere may be provided by, for example, employing atomizing or fogging nozzles within an enclosed chamber.

While atomizing moisture is a preferred way to provide moisture of mixing, other methods of providing a highly moist mixing environment may be used, e.g., air carrying a high quantity of water vapor may be utilized. More specifically, air, having a relative humidity, preferably 90–95 percent, and maintained at a temperature of up to about 125° F can be utilized as the moist atmosphere in which the cement and fertilizer are mixed in the scope of this invention. Pouring water in a steady stream into the cement will not produce the desired coating.

It should be emphasized that in accordance with the invention, that one of the purposes for adding a controlled amount of moisture is to obtain a good adherence between the cement coating and the fertilizer particle. When the cement is to be utilized without the elastomer, moisture may not even be required for very thin surface coating. However, some moisture is preferable. In addition, when the cement coating is used in conjunction with the elastomer, some addition of moisture is always required to facilitate the addition of the elastomer coat.

The elastomer that can be used within the scope of the instant invention may be any of a group of synthetic high polymeric material with properties that are best described as rubbery. A preferred group of elastomers that may be used within the scope of the invention are the so-called emulsion elastomers. Preferably, the emulsion elastomers used within the scope of the subject invention are of a group commonly known as the latexes and particularly those latexes which may be emulsified within a water-continuous phase such as those utilized in latex paints. The preferred latexes are water emulsified latexes which are degradable upon exposure to the elements, for example, styrene butadiene acrylic esters, and alkyd resins. The most preferred latex is styrene butadiene because of economy and availability.

The amount of latex utilized in accordance with the instant invention is generally sufficient to fully coat the partially hydrated cement coat which encapsulates the fertilizer particle. About ¼% by weight of dried latex based upon the weight of the fertilizer component alone has been found to be sufficient. The latex is generally applied by subjecting the fertilizer encapsulating cement to a super-saturated latex emulsion atmosphere which is produced by, for example, atomizing a latex emulsion through nozzles in an enclosed area. When the super-saturated latex emulsion atmosphere is utilized, about one gallon of an aqueous latex emulsion which consists of about 80% by weight latex and about 20% by weight water per ton of the fertilizer component has been found sufficient to obtain a hardened latex coating which is about ¼% latex by weight based upon the weight of the fertilizer component only.

An aqueous latex emulsion consisting of from about 25% to about 30% by weight latex may be utilized in accordance with the invention in forming the super-saturared latex emulsion atmosphere. When emulsions of this lower percentage are utilized however, the partially hydrated cement coated fertilizer particle is preferably passed through the emulsion coating step twice.

However, as the concentration of the latex in the aqueous emulsion approaches about 60% to about 70% latex by weight, the partially hydrated cement coated fertilizer particle need only be subjected to the latex emulsion atmosphere once.

When a second cement coating is utilized in accordance with the instant invention, the cement powder is initially admixed with plant nutrients which are preferably the so-called micronutrient trace elements but may be any fertilizer material wherein relatively rapid selected release is desired. The fertilizer material thus used is of the approximate particulate size of the particles of powdered cement. Therefore, such fertilizer material may initially have to be comminuted and sieved in order to obtain the desired particulate size.

Although preferably, the micronutrient trace elements are present in the second cement coating in accordance with the invention, it is within the scope of the instant invention that either or both of the cement coatings may contain micronutrient trace elements. It will be realized that when the initial, or inner partially hydrated cement coating contains the micronutrients, that such micronutrient will be controllably released. On the other hand, the micronutrients present in the second or outer cement coating will undergo more or less immediate release as previously described.

Thus, in accordance with the invention, a first more immediate application of micronutrients may be facilitated by utilizing the second partially hydrated cement coating containing admixed micronutrient. A second more delayed application of micronutrient is facilitated by utilizing a first partially hydrated cement containing dispersed micronutrient trace elements.

A controlled release fertilizer in accordance with one embodiment utilizing only a single coat of partially hydrated cement without the elastomer coating may be prepared quite simply. The fertilizer granules are intimately admixed or contacted with a substantially non-hydrated cement. This admixing or contacting may be accomplished in a variety of known ways, for example, by utilizing a drop mixer, a concentric cone mixer, an auger-type mixer or a tumbler-type mixer, all of which are conventional. Thicker coatings are usually preferred as long as they do not exceed the thickness beyond which flaking occurs. Such thicker coatings require a wet or moist coating method. This method involves providing a moist environment, as by using a fog of atomized water into which is blown the cement powder. A cylindrical mixer, turned on rollers, with a conventional concentrical disposed atomizer spray tube may be effectively utilized to provide the desired amount of moisture during the process of admixing the fertilizer and cement in the mixer. The amount of moisture is preferably carefully controlled to minimize any tendency for particles to agglomerate. When material agglomeration is noted, the amount of moisture should be reduced to the point that the agglomeration tendency disappears.

The hydration of the cement when the cement coating is utilized alone does not exceed a maximum of about 30%. The preferred range is less than about 20%. Typically, the hydration actually realized runs about 15%.

The following specific examples of the practice of the present invention are offered for the purpose of illustration only and are not to be taken as limiting the scope of the invention.

EXAMPLE 1

In this example, a control release fertilizer consisting of a cement coated fertilizer particle without the latex covering, was prepared. One hundred pounds of urea and 7 pounds of Portland cement are mixed in the presence of atomized water in a rotating drum. The mixing is accomplished for a period of 1 minute with the drum rotating at a speed of about 15 rpm. The drum is of a diameter of four feet and has extending concentrically therethrough a pipe carrying water, which pipe has a plurality of spaced apart atomizer heads to provide the atomized moisture within the drum during tumbling. The end product removed from the drum is found to comprise a thin but fully coated fertilizer particle. The extent of cement hydration for the cement in the coating does not exceed over about 30%, based only on the weight of cement plus water.

EXAMPLE 2

Example 1 is repeated, except that 8 pounds of Portland cement are used. A satisfactory product, but with an increased coating thickness is obtained. The release characteristics of this particle provide a longer release period than in Example 1.

EXAMPLE 3

The foregoing example is repeated, except that 15 pounds of masonry cement are utilized. Again the end product is found to be fully coated, and to possess a low cement hydration, the extent of hydration being about 20%, based only on weight of cement plus water. These particles have yet a thicker coating than the end products of Examples 1 and 2, and accordingly provide a more sustained release of fertilizer when applied to soil.

EXAMPLE 4

The foregoing example is repeated except that 5 pounds of Portland cement are thoroughly mixed with 5 pounds of masonry cement prior to the admixing of the fertilizer with the cement material. Again a fully coated product possessing low cement hydration is obtained.

EXAMPLE 5

The product of Example 2 is utilized in a comparative test to compare its toxicity effects to an uncoated fertilizer. Five thousand grams of soil are mixed with 400 grams of treated (coated) fertilizer and, in a control sample, 5000 grams of the same type soil are mixed with 400 grams of untreated fertilizer. Seeds are planted in each resulting sample and under parallel controlled conditions, providing like moisture and sunlight conditions, the growth results are observed. It is found that growing proceeds satisfactorily without apparent toxic effects in the sample where the coated (treated) fertilizers was utilized, whereas severe toxicity is noted in the sample where the untreated fertilizer was used.

EXAMPLE 6

A growing test is conducted utilizing sand filled pans, one sample being fertilized with untreated (uncoated) urea, and a second sample being fertilized with treated (coated) urea, this later material being coated in accordance with Example 3. Beans were grown in the sand pans under parallel growing conditions and equal number of plants. In the instance of the coated fertilizer, a total yield of 570 grams of beans was realized, while in the instance of the uncoated fertilizer, a total yield of 420 grams was realized.

EXAMPLE 7

In this example, a solid controlled, release fertilizer of a fertilizer particle encapsulated in a substantially uniform thick coat of partially unhydrated cement which in turn is encapsulated in a thin substantially uniform semipermeable elastomer coating was produced utilizing the technique and apparatus described above. Initially 100 pounds of prilled urea was coated with the partially unhydrated cement. The particles were placed in vessel 10, which was energized to oscillate the particles. Simultaneously, 4 pounds of Portland cement maintained on the semipermeable member 22 was sifted onto the oscillating fertilizer particles and atomized water from nozzles 30 maintained a saturated atmosphere inside vessel 10. The coated product was then transferred to vessel 42, which was energized. The oscillating particles in vessel 42 were brought into intimate contact with a saturated emulsion of water and styrene butadiene. The emulsion was applied through spray nozzles 52 to coat the particles with approximately 0.25 pounds of styrene butadiene. The product was then transferred to semipermeable member 56 and the moisture not absorbed removed.

The solid control release fertilizer product thus produced was then placed in a leaching tank containing water. After a period of 24 hours, 15% of the total nitrogen available had been leached from the product. By the third day, 25% of the total nitrogen available had been leached from the product, and at 7 days, approximately 30% of the available nitrogen had been leached from the product. Thereafter, the product was monitored at daily intervals. The average leach rate was approximately 0.85% per day until termination on about the eighty-fifth day.

The above test clearly indicates that the solid control release fertilizer particle of the instant invention releases available nitrogen at a controlled rate, even when placed directly into a solubilizing substance such as water. Further, this test shows a larger initial release of available nitrogen with a gradual diminution of the released rate.

EXAMPLE 8

In this example, the product as described in Example 7 was prepared. In this example however, masonry cement was used. Initially 100 pounds of urea was coated with 12 pounds of masonry cement, which was partially hydrated. The cement coated particle was then coated with 0.25 pounds of a styrene butadiene applied as an aqueous emulsion, as described in Example 7.

The product was placed in the leach tank containing water. Of the total nitrogen available, 15% was released in the first 24 hours. At the 3 day interval, 21% of the available nitrogen had been released while 24% was released by the seventh day. Thereafter, available nitrogen was released at an average rate of about 0.65% per day until termination at approximately one hundred twenty days.

EXAMPLE 9

In this example, the product essentially as described in Example 7 was prepared. Initially, 100 pounds of urea was coated with 4 pounds of Portland cement, which was partially hydrated. The cement coated particle was then coated with 0.25 pounds of acrylic ester which was applied as an aqueous emulsion, as described in Example 7.

The product was placed in the leach tank containing water. Of the total nitrogen available, 14% was released in the first 24 hours. At the three day interval, 22% of the available nitrogen had been released, while 28% was released by the seventh day. Thereafter, available nitrogen was released at an average rate of about 0.80% per day until termination at approximately one hundred twenty days.

EXAMPLE 10

In this example, the product essentially as described in Example 7 was prepared. Initially, 100 pounds of urea was coated with 12 pounds of masonry cement, which was partially hydrated. The cement coated particle was then coated with 0.25 pounds of acrylic ester which was applied as an aqueous emulsion, as described in Example 7.

The product was placed in the leach tank containing water. Of the total nitrogen available, 15% was released in the first 24 hours. At the three day interval, 21% of the available nitrogen had been released while 24% was released by the seventh day. Thereafter, available nitrogen was released at an average rate of about 0.65% per day until termination at approximately one hundred twenty days.

EXAMPLE 11

In this example, a control release fertilizer having a first partially hydrated cement coating, a second thin coating of semipermeable elastomer and a final coating of a mixture of micronutrient trace elements and cement, which is partially unhydrated, was produced utilizing the technique and apparatus described above. One hundred pounds of 12-12-12 fertilizer was coated with 5 pounds of Portland cement, which was partially hydrated. The cement coated particle was then coated with 0.28 pounds of styrene butadiene, which was applied as an aqueous emulsion. Both coatings were applied essentially as described in Example 7. The product was then placed in vessel 10 which was energized to oscillate the particles. Simultaneously, 5 pounds of a mixture of cement and trace elements maintained on the semipermeable member 22 was sifted onto the oscillating fertilizer particles and atomized water from nozzles 30 maintained a saturated atmosphere inside vessel 10. The mixture of cement and trace elements contained the following: 2½ Portland cement, 1 pound manganese sulfate, 1 pound borax, 1/16 pound copper sulfate, 1/16 pound zinc dust, and ⅜ pound hydrated $Fe_2O_3$.

The fertilizer thus produced was tested for micronutrient release on crops. Each crop test was conducted by placing a specific plant in a pair of shallow pans. Each pan contained Ottawa sand as a growing medium. One of the pans contained the fertilizer prepared as described above; the other contained an identical 12-12-12 slow release fertilizer but without the final coating of cement and trace elements. Various pairs of pans contained plants known for their behavior in the absence of specific trace elements. A first pair contained oats, a second alfalfa, a third soyabeans, a fourth squash, and a fifth millet. oats are known to develop "gray specks" in the absence of manganese. Alfalfa develops reddish-yellow and purplish colored leaf margins in the absence of boron. Soybeans are severely stunted in growth when copper is absent. Squash develops mottled leaves with dead areas in the absence of sufficient zinc. Millet's growth rate is sensitive to the amount of iron present.

All plants were allowed to grow to maturity. A comparison of the crops in each pair of pans showed that the micronutrients were released and subsequently utilized by the plants.

Having described the invention in connection with certain specific embodiments thereof, it is to be understood that further modifications may now suggest themselves to those skilled in the art and it is intended to cover such modifications as fall within the scope of the appended claims.

What is claimed is:

1. A solid controlled release fertilizer comprising a discrete particle of fertilizer material having:
    a. a substantially uniform first coating of a cement partially hydrated with up to about 30 weight percent water;
    b. a substantially uniform second coating around said first coating of a thin semipermeable elastomer; and
    c. a substantially uniform third coating around said second coating of a partially hydrated homogeneous cement-fertilizer mixer containing thoroughly dispersed therein micronutrient trace elements.

2. The fertilizer of claim 1 wherein said cement-fertilizer coating contains cement selected from a group consisting of masonry cement, Portland cement and masonry cement containing lime; and wherein both of the first and third coatings contain thoroughly dispersed therein micronutrient trace elements.

3. The fertilizer of claim 1 wherein the extent of hydration does not exceed that hydration effected by addition of fine droplets of water to a nonhydrated cement powder wherein said water is present in amounts from about 2% to about 6% by weight based on the cement component only.

4. The fertilizer of claim 3 wherein said cement is Portland cement and wherein said water is present in amounts from about 3% to about 6% by weight based on the cement component only.

5. The fertilizer of claim 3 wherein the cement is masonry cement and wherein said water is present in amounts from about 2% to about 4½% by weight based on the cement component only.

6. The fertilizer of claim 3 wherein said elastomer is selected from a group consisting of styrenebutadiene, acrylic esters, and alkyd resins.

7. A process of manufacturing a controlled release fertilizer comprising:
    a. coating a discrete particle of fertilizer material with a substantially uniform first coating of cement partially hydrated with up to about 30 weight percent water;
    b. coating the fertilizer particle of step (a) with a substantially uniform second coating of semipermeable elastomer; and
    c. coating the fertilizer particle of step (b) with a substantially uniform third coating of a homogeneous mixture of a partially hydrated cement and a fertilizer.

8. The process of claim 7 wherein said homogeneous mixture contains cement selected from a group consisting of masonry cement, Portland cement and masonry cement containing lime and a fertilizer of micronutrient trace elements.

9. The process of claim 8 wherein the third coating is accomplished by intimately contacting said fertilizer particle of step (b) with an effective amount of a nonhydrated cement micronutrient powder mixture in the presence of fine droplets of water, said water being present in amounts from about 2% to about 6% by weight based on the cement component only.

10. The process of claim 9 wherein masonry cement is present in the amount of about 22 lbs. of masonry cement per 100 lbs. of fertilizer, and micronutrients are present in the amount of about 50% by weight based upon the cement component only.

11. The process of claim 9 wherein said water is present in amounts from about 2% to about 4½% by weight based on the cement component only.

12. The product produced by the process of claim 11.

13. The process of claim 9 wherein Portland cement is present in amounts of about 7 lbs. of Portland cement per 100 lbs. of fertilizer and micronutrients are present in the amount of about 50% by weight based on the cement component only.

14. The process of claim 13 wherein said water is present in amounts from about 3% to about 6% by weight based on the cement component only.

15. The product produced by the process of claim 14.

* * * * *

UNITED STATES PATENT AND TRADEMARK OFFICE
CERTIFICATE OF CORRECTION

PATENT NO. : 4,023,955
DATED : May 17, 1977
INVENTOR(S) : Otto H. Mueller

It is certified that error appears in the above-identified patent and that said Letters Patent are hereby corrected as shown below:

Col. 1, line 62, change "herein" to --therein--.

Col. 2, line 11, change "expensive" to --expense--.

Col. 2, line 22, insert --the-- before "thin".

Col. 2, line 39, change "unhydrates" to --unhydrated--.

Col. 3, line 35, change "with" to --within--.

Col. 3, line 56, change "perticles" to --particles--.

Col. 4, line 32, insert --F-- after "120°".

Col. 6, line 39, change "the" to --this--.

Col. 9, line 32, change "supersaturared" to --supersaturated--.

Col. 13, line 18, insert --pounds-- after "2 1/2".

Signed and Sealed this

Twentieth Day of September 1977

[SEAL]

Attest:

RUTH C. MASON
Attesting Officer

LUTRELLE F. PARKER
Acting Commissioner of Patents and Trademarks